United States Patent
Kaleko et al.

(10) Patent No.: US 11,477,614 B2
(45) Date of Patent: Oct. 18, 2022

(54) DEVICE, SYSTEM AND METHOD FOR VERTICAL LOCATION CHANGE NOTIFICATIONS BASED ON PERIODIC LOCATION REPORTS

(71) Applicant: MOTOROLA SOLUTIONS, INC., Chicago, IL (US)

(72) Inventors: David Kaleko, Chicago, IL (US); Alexander Saputa, Chicago, IL (US); Juan Felipe Gonzalez-Gomez, Chicago, IL (US); Luke Young, Chicago, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 4 days.

(21) Appl. No.: 17/080,315

(22) Filed: Oct. 26, 2020

(65) Prior Publication Data
US 2022/0132273 A1  Apr. 28, 2022

(51) Int. Cl.
*H04W 4/029* (2018.01)

(52) U.S. Cl.
CPC .................. *H04W 4/029* (2018.02)

(58) Field of Classification Search
CPC .......... H04W 4/029; H04W 4/90; H04W 4/33
See application file for complete search history.

(56) References Cited

U.S. PATENT DOCUMENTS

| | | | |
|---|---|---|---|
| 6,850,163 B1 | 2/2005 | Adamczyk et al. | |
| 7,328,029 B1 | 2/2008 | Adamczyk et al. | |
| 8,217,795 B2 | 7/2012 | Carlton-Foss | |
| 8,680,991 B2 | 3/2014 | Tran | |
| 9,036,019 B2 | 5/2015 | Hanson et al. | |
| 10,692,024 B2 | 6/2020 | Morgenthau | |
| 2008/0129518 A1* | 6/2008 | Carlton-Foss | G08B 25/10 340/573.1 |
| 2011/0260871 A1* | 10/2011 | Karkowski | G08B 21/22 340/573.1 |
| 2016/0330601 A1 | 11/2016 | Srivastaba | |

FOREIGN PATENT DOCUMENTS

WO  0019170 A1  4/2000

* cited by examiner

*Primary Examiner* — Kabir A Timory
(74) *Attorney, Agent, or Firm* — Perry + Currier, Inc.

(57) ABSTRACT

A device, system and method for vertical location change notifications based on periodic location reports is provided. A device receives periodic location reports via a location determining device of a mobile device, the mobile device physically coupled to a user. The device identifies, using the periodic location reports, a vertical location change. The device compares the vertical location change to a threshold vertical location change condition. The device, responsive to determining that the vertical location change meets the threshold vertical location change condition, causes a notification device to provide a notification of the vertical location change.

20 Claims, 5 Drawing Sheets

DEVICE, SYSTEM AND METHOD FOR VERTICAL LOCATION CHANGE NOTIFICATIONS BASED ON PERIODIC LOCATION REPORTS

BACKGROUND OF THE INVENTION

Keeping track of movement of public safety personnel, and the like, is a common problem, which often depends on accelerometers in devices operated by the public safety personnel. However, accelerometers, and the like, may fail and/or a sudden and/or brief changes in acceleration may not be effectively detected and/or reported.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Keeping track of movement of public safety personnel, and the like, is a common problem, which often depends on accelerometers in devices operated by the public safety personnel. However, accelerometers, and the like, may fail and/or a sudden and/or brief changes in acceleration may not be effectively detected and/or reported. In particular, when firefighters, and the like, undergo rapid vertical changes in position due to explosions, floors giving away, falling through holes and/or downstairs, and the like, the acceleration may be so rapid and brief that it may not be adequately measured and/or reported to a central computing device, and/or it may be useful to supplement data from accelerometers, and the like.

Hence, provided herein is a device, system and method for vertical location change notifications based on periodic location reports. For example, mobile devices of users, such as public safety personnel, generally include location determining devices and/or circuits, such as Global Positioning System (GPS) devices and the like. As provided herein, a location determining device periodically determines a location, and a mobile device, into which the location determining device is incorporated, periodically provides, to a computing device, periodic location reports that include respective locations of the mobile device as determined by the location determining device, for example in GPS and/or three-dimensional (3D) coordinates. The computing device receives the periodic location reports and identifies changes in position of the mobile device from the periodic location reports; the changes in position of the mobile device are understood to also indicate changes in position of a user of the mobile device. Both horizontal and vertical location changes may be determined. As vertical location changes may be more dangerous to the user of the mobile device (e.g., due to falls, and the like), the computing device compares a vertical location change to one or more threshold vertical location change conditions and, when a vertical location change meets a threshold vertical location change condition, the computing device may cause a notification device to provide a notification of the vertical location change.

A threshold vertical location change condition is generally understood to indicate whether a vertical location change of the mobile device and/or a user is anomalous and/or unusual and/or unexpected and/or dangerous.

An aspect of the specification provides a method comprising: receiving, at a computing device, periodic location reports via a location determining device of a mobile device, the mobile device physically coupled to a user; identifying, by the computing device, using the periodic location reports, a vertical location change; comparing, by the computing device, the vertical location change to a threshold vertical location change condition; and responsive to determining, by the computing device, that the vertical location change meets the threshold vertical location change condition, causing a notification device to provide a notification of the vertical location change.

Another aspect of the specification provides a device comprising: a communication unit; and a controller communicatively coupled to the communication unit, the controller configured to: receive periodic location reports via a location determining device of a mobile device, the mobile device physically coupled to a user; identify, using the periodic location reports, a vertical location change; compare the vertical location change to a threshold vertical location change condition; and responsive to determining that the vertical location change meets the threshold vertical location change condition, cause, via the communication unit, a notification device to provide a notification of the vertical location change.

Figure 1:
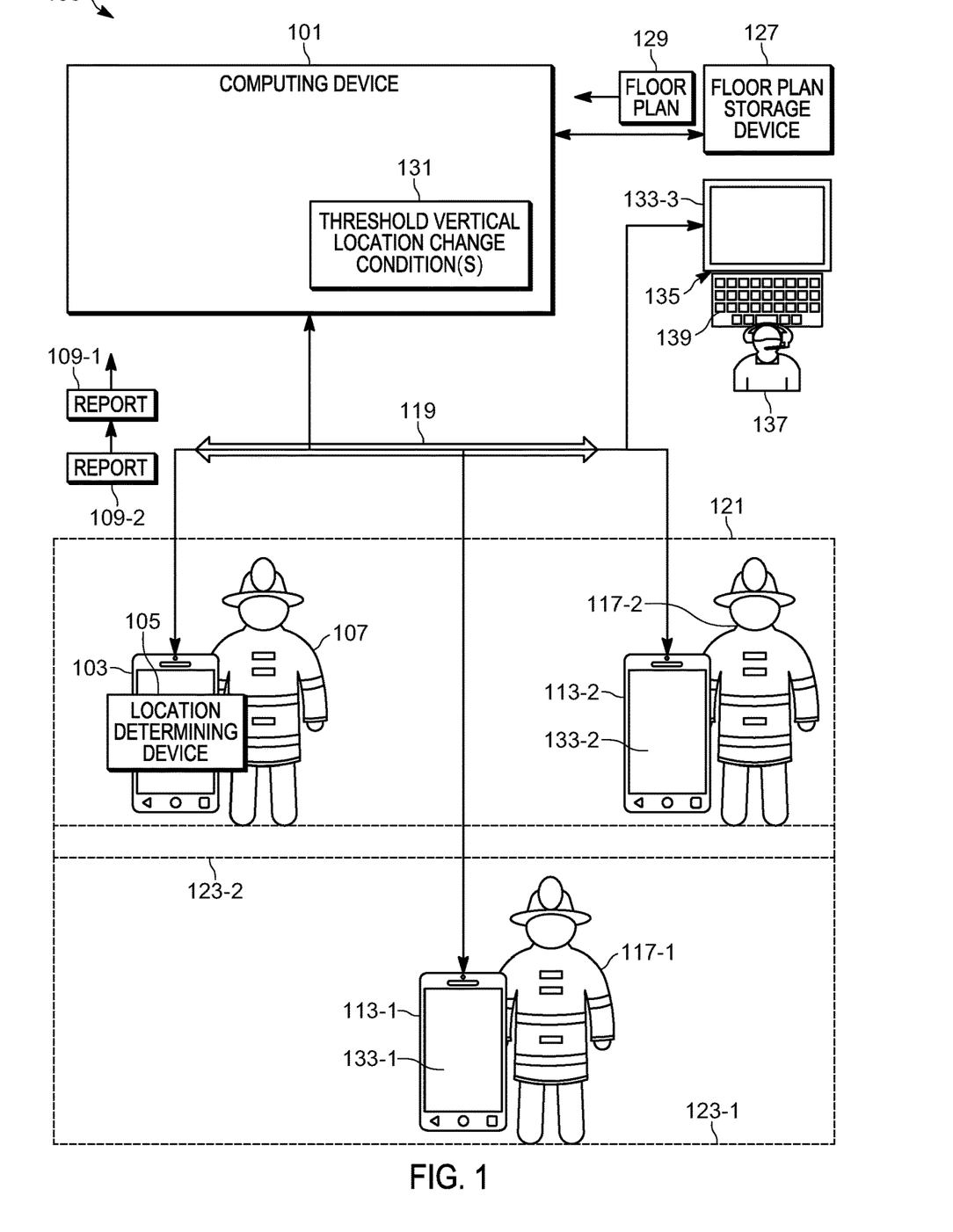
FIG. 1 is a system for vertical location change notifications based on periodic location reports, in accordance with some examples.

Attention is directed to FIG. 1, which depicts an example system 100 for vertical location change notifications based on periodic location reports. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

While present examples are described with respect to a computing device and mobile devices associated with a public-safety entity (e.g., such as a fire department, and the like), computing devices and mobile devices associated with other types of entities may leverage a same or similar technique as described herein. For example, computing devices and mobile devices associated with a warehousing entity, a construction entity, a service industry entity and/or any suitable entity in which employees, and the like, may undergo dangerous vertical location changes, may implement a same or similar technique as described herein.

The system 100 comprises a computing device 101 in communication with a mobile device 103 that includes a location determining device 105, such as a GPS device and the like. However the location determining device 105 may comprise any suitable device and/or circuit for determining a vertical location and/or a three-dimensional location and/or elevation including, but not limited to, a Global Navigation Satellite System (GLONASS) device, a Galileo device, a BeiDou Navigation Satellite System (BDS) device, any other suitable satellite navigation device, a triangulation device and/or tetrangulation device and/or multilateration device, and the like.

As depicted, the mobile device 103 is generally physically coupled to (e.g., attached to via a clip, belt, harness, carrier, and the like,) a user 107, such as a firefighter, and/or other public safety personnel, and the like. However, while present examples are described with respect to a computing device and mobile devices associated with a public safety personnel and/or public-safety entities (e.g., such as firefighters, a fire department, police officers, a police department, and the like), computing devices and mobile devices associated with other types of entities may leverage a same or similar technique as described herein. For example, computing devices and mobile devices associated with a warehousing entity, a service industry entity (e.g., a cleaning entity, and/or any suitable entity in which employees, and the like, may undergo falls and/or other accidents where employees, and the like may fall) may implement a same or similar technique as described herein.

In general the location determining device 105 is understood to be periodically determining a location of the mobile device 103. The mobile device 103 is understood to be transmitting periodic location reports 109 (e.g., as depicted a first report 109-1 and a second report 109-2) to the computing device 101, the periodic location reports 109 including a respective location of the mobile device 103 and/or the user 107 as determined by the location determining device 105. The reports 109 may be generated by the location determining device 105 and/or the mobile device 103 (e.g., using locations determined by the location determining device 105). Regardless, the reports 109 are understood to be at least partially generated by the location determining device 105. As such, the reports 109 may be referred to as being received via the location determining device 105 and/or by the use of the location determining device 105.

In some examples, the mobile device 103 may further include other types of devices for determining movement of the user 107 such as an accelerometer, a gyroscope, a magnetometer and the like. It is understood that such devices may determine, for example, direction of movement and/or velocity and/or acceleration, of the mobile device 103 and/or the user 107 and the direction of movement and/or velocity and/or acceleration may be incorporated into the reports 109 (e.g., as metadata and the like) and/or separated reports transmitted to the device 101. However, such devices may also fail and/or may not gather data quickly enough for accurate reporting of direction of movement and/or velocity and/or acceleration. Regardless, it is understood that the locations reported in the reports 109 are determined by the location determining device 105, and that such locations are not determined by accelerometers, gyroscope, magnetometers, and the like.

It is understood that the first report 109-1 is first transmitted and the second report 109-2 is later transmitted after the first report 109-1. Furthermore, the mobile device 103 may transmit other reports 109 (not depicted) between the first report 109-1 and the second report 109-2 and/or the reports 109-1, 109-2 may not be transmitted immediately one-after-the other. Furthermore, the mobile device 103 may transmit the reports 109 with any suitable periodicity, for example, as often as the location determining device 105 determines a location and/or according to any other suitable periodicity.

Regardless, the computing device 101 is understood to periodically receive the periodic location reports 109 from which changes in location of the mobile device 103 and/or the user 107 may be determined. For example, respective locations in the reports 109-1, 109-2 may be compared with each other to determine changes in location therebetween. Furthermore, as the location determining device 105 is understood to determine a 3D location (e.g., a GPS location), the changes in location of the mobile device 103 and/or the user 107 may be in a horizontal or vertical direction. In particular, the terms horizontal and vertical, as used herein, are understood to be relative to the surface of the earth, and the like.

The reports 109 may further be transmitted with metadata, and the like, identifying the mobile device 103 and/or identifying the user 107. Regardless, it is understood that the computing device 101 is generally configured to determine that the reports 109 are received from the mobile device 103 and/or the user 107.

Furthermore, the reports 109 may include times that the locations were determined and/or the computing device 101 may assign a time to a report 109 based on a time that a report 109 was received. Regardless, the computing device 101 may be further configured to determine a time associated with a report 109, such that the computing device 101 may associate a change in location of the mobile device 103 and/or the user 107 with a time period over which the change in location occurred. For example, the computing device 101 may compare respective locations and times in the reports 109-1, 109-2 to determine a change in location between the reports 109-1, 109-2 and a time period over which the change in location occurred.

As depicted, the system 100 further includes other mobile devices 113-1, 113-2 respectively operated by other users 117-1, 117-2 (e.g., as depicted firefighters). The mobile devices 113-1, 113-2 are interchangeably referred to hereafter, collectively, as the mobile devices 113 and, generically, as a mobile device 113. This numbering convention will be used throughout the present specification. For example, the users 117-1, 117-2 are interchangeably referred to hereafter, collectively, as the users 117 and, generically, as a user 117. Similarly, as has already been described, the periodic location reports 109-1, 109-2 are interchangeably referred to, collectively, as the reports 109 and, generically, as a report 109.

In some examples, one or more of the users 117 may be a supervisor of the user 107, as set out in an organizational hierarchy, and/or an electronic organizational hierarchy, electronic employee records, and the like. Hence, one or more of the users 117 may be referred to as supervisors, and one or more of the mobile devices 113 may alternatively be referred to herein as supervisory devices. Regardless, while not depicted, in such examples, it is understood that the computing device 101 may have access to an electronic organizational hierarchy and/or electronic employee records to determine a relative hierarchical position of the user 107 and/or the mobile device 103 relative to the users 117 and/or the mobile devices 113. In particular, the some examples, the computing device 101 may have access to a database, and the like, of associations between the mobile devices 103, 113 and the users 107, 117, as well as an electronic organizational hierarchy, such that the computing device 101 may determine hierarchical relationships between the mobile devices 103, 113 and/or the users 107, 117. hence, via the electronic organizational hierarchy and/or another suitable database (e.g., of employee records and the like), the computing device 101 may be configured to determine that a mobile device 113 is a supervisory device.

However, in other examples, one or more of the users 117 may be an emergency medical technician (EMT), a doctor, trained in medical procedures, and the like. Hence, one or more of the users 117 may be referred to as medical technicians, and one or more of the mobile devices 113 may alternatively be referred to herein as an emergency medical devices. Furthermore, via the electronic organizational hierarchy and/or another suitable database (e.g., of employee records and the like), the computing device 101 may be configured to determine that a mobile device 113 is an emergency medical device.

Furthermore, while not depicted, one or more of the mobile devices 113 may also include respective location determining devices and provide respective periodic location reports to the computing device 101, similar to as described above with respect to the reports 109. Regardless, it is understood herein that the computing device 101 may also have access to locations of the mobile devices 113 and/or the users 117.

As depicted, the mobile devices 103, 113 may be communicating with each other, and/or the computing device 101, via respective communication links therebetween. Hence, as depicted, communications 119 are occurring on the communication links, the communications 119 comprising audio and/or video and/or textual messages that may be monitored and analyzed by the computing device 101. In some examples, the computing device 101 may include a speech-to-text module to assist in monitoring and analyzing of the communications 119.

As depicted, the users 107, 117 are located in a building 121, with the user 117-1 being located on a lower floor 123-1 of the building 121, and the users 107, 117-2 located on an upper floor 123-2 of the building 121. For clarity, to distinguish from communication links between electronic components of the system 100, the building 121 and the floors 123-1, 123-2 (e.g., the floors 123 and/or a floor 123) are depicted in dashed lines.

For further clarity, while the term "floor" can generically refer to a level base of a room, herein, the term "floor" will refer to a vertical level and/or a vertical floor and/or a storey of the building 121, while the term "supporting surface", as used herein, will refer to a level base of a vertical level and/or vertical floors and/or storey of the building 121 upon which a user 107, 117 may stand.

It is further understood that while the building 121 is depicted schematically, with a small number of structural features (e.g., basic walls and the floors 123), the building 121 may include other features and/or structural features including, but not limited to, devices and/or building components for safely traversing vertical floors 123 of the building 121 and/or components for moving between the floors 123. For example, the building 121 may include, but is not limited to, stairs, elevators, windows, atriums, balconies, skylights, and the like.

As depicted, the system 100 optionally further comprises a floor plan storage device 127 in communication with the computing device 101. For example, the floor plan storage device 127 may comprise an emergency evacuation server, and the like, which stores, and/or has access to, floor plans of buildings, which may be retrieved by public-safety devices and/or any other suitable devices. For example, as the computing device 101 may be associated with, and/or operated by, a public-safety entity, such as a fire department, and the like; hence the computing device 101 may comprise a public-safety device. For example, as depicted, the computing device 101 is optionally receiving and/or retrieving a floor plan 129 of the building 121 from the floor plan storage device 127.

As will be explained in more detail below, the computing device 101 is generally configured to receive the periodic location reports 109, identify a vertical location change from the periodic location reports 109, and compare the vertical location change to one or more threshold vertical location change conditions 131. The one or more threshold vertical location change conditions 131 may indicate whether a vertical location change of the mobile device 103 and/or the user 107 is anomalous and/or unusual and/or unexpected and/or dangerous. For example, the user 107 may fall through a floor 123, and/or experience a rapid change in vertical location and/or a change in velocity and/or change in acceleration, and the one or more threshold vertical location change conditions 131 may define such rapid changes, and the like, as described in more detail below.

Hence, while described in more detail below, the one or more threshold vertical location change conditions 131 may be time based, location based and/or environmental context based (e.g., using the floor plan 129 and/or the communications 119), based on a comparison with a corresponding horizontal location change, and the like.

The computing device 101 is further configured to, responsive to determining that a vertical location change meets a threshold vertical location change condition 131, cause a notification device to provide a notification of the vertical location change. For example, as depicted, the mobile devices 113 comprise respective notification devices 133-1, 133-2 in the form of display screens. Similarly, as depicted, the system 100 further comprises a dispatch device 135, operated by a dispatcher 137, the dispatch device 135 including a respective notification device 133-3, also in the form of a display screen. However, the notification devices 133-1, 133-2, 133-3 (e.g., notification devices 133 and/or a notification device 133) may include any suitable notification devices including, but not limited to, the depicted display screens, speakers, haptic devices, and the like. Hence, the computing device 101 may, responsive to determining that a vertical location change meets a threshold vertical location change condition 131, cause one or more of the notification device 133 to provide a notification of the vertical location change.

As depicted, the dispatch device 135 is understood to be in communication with the mobile devices 103, 113, as well as the computing device 101, and indeed the dispatch device 135 may further contribute to the communications 119. For completeness, as depicted, the dispatch device 135 is understood to include an input device 139, for example in the form of a keyboard, a pointing device, and the like.

While two mobile devices 113 respectively associated with two users 117 are depicted, as well as one dispatch device 135 associated with one dispatcher 137, the system 100 may comprise any suitable number of mobile devices 113 and/or dispatch devices 135 as long as the system 100 includes at least one notification device 133 (e.g., which may be at a mobile device 113 and/or a dispatch device 135 and/or any other suitable device, which may, or may not, be mobile).

Figure 2:
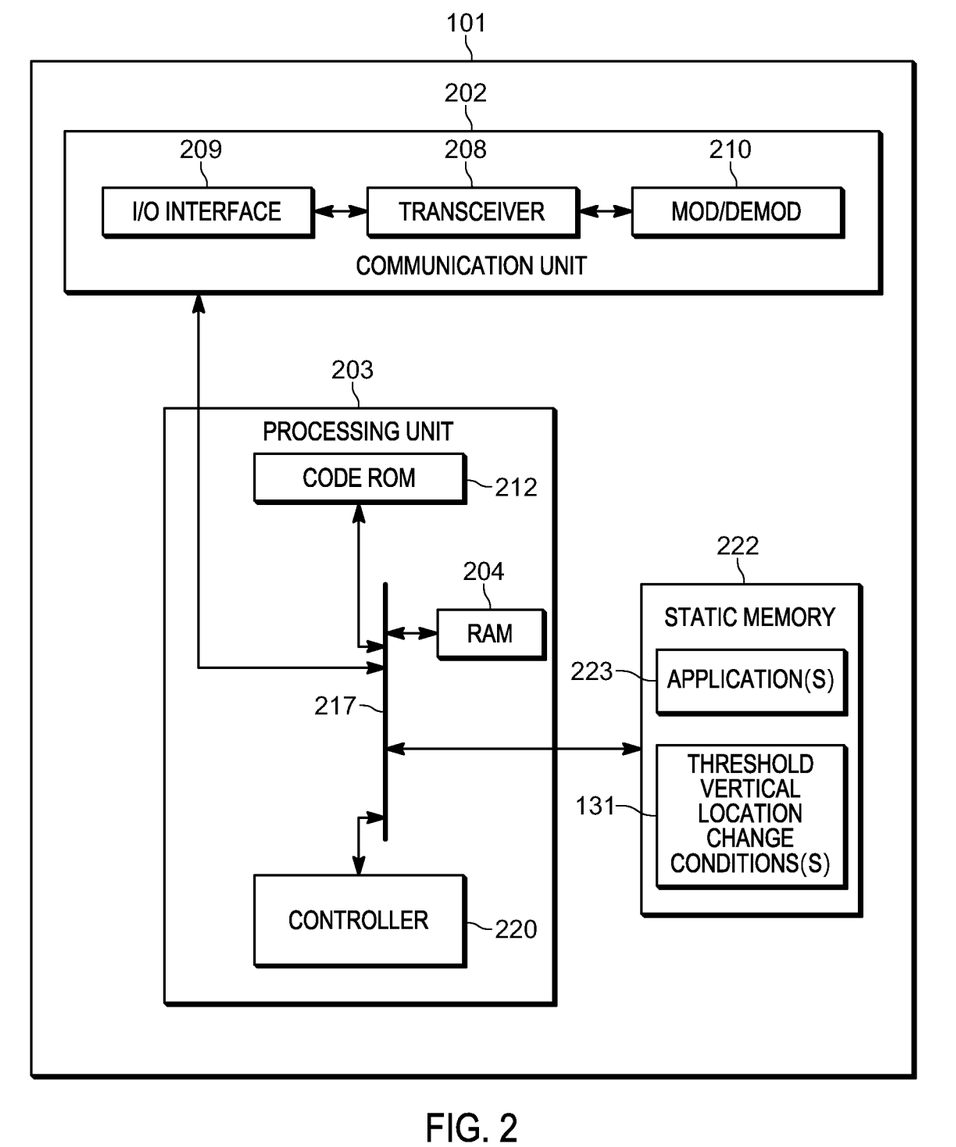
FIG. 2 is a device diagram showing a device structure of a computing device for vertical location change notifications based on periodic location reports, in accordance with some examples.

Attention is next directed to FIG. 2, which depicts a schematic block diagram of an example of the computing device 101. In general, the computing device 101 may comprise one or more servers and/or one or more cloud computing devices, and the like, configured to communicate with the devices 103, 113, 127, 135 and/or any other suitable component of the system 100. However, the computing device 101 may comprise a computing device such as a personal computer and/or a laptop computer, and the like. Indeed, in some examples, functionality of the computing device 101 may be combined with one or more of the devices 103, 113, 135. For example, the mobile device 103 may include at least partial functionality of the computing device 101, for example to determine location (e.g., and time) changes indicated by the reports 109, and the like, and report the location (e.g., and time) changes to the computing device 101. However, in some examples, the functionality of the computing device 101 may be entirely combined with the mobile device 103 and/or the mobile devices 113 and/or the dispatch device 135. Indeed, in some examples, the mobile devices 103, 113 may each include an application, and the like, that provides the functionality of the computing device 101 as described hereafter. In other examples, the computing device 101 and the dispatch device 135 may be combined.

As depicted, the computing device 101 comprises: a communication unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

While not depicted, the computing device 101 may include one or more of an input device and a display screen and the like, a microphone (e.g., to receive voice commands) such that a user (e.g., an administrator of the system 100), may interact with the computing device 101. In some examples, the computing device 101 may include a clock, and the like (including, but not limited to, a clock of the controller 220 and/or the processing unit 203), which may be used to determine a time at which a report 109 is received.

As shown in FIG. 2, the computing device 101 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with the devices 103, 113, 127, 135 and/or any other suitable component of the system 100. For example, the communication unit 202 may include one or more transceivers 208 and/or wireless transceivers for communicating with the devices 103, 113, 127, 135, and/or any other suitable component of the system 100. Hence, the one or more transceivers 208 may be adapted for communication with one or more communication networks used to communicate with the devices 103, 113, 127, 135, and/or any other suitable component of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g., hardware ports) for coupling to other hardware components.

The controller 220 may include one or more logic circuits, one or more processors, one or more microprocessors, and/or the controller 220 may include one or more ASIC (application-specific integrated circuits) and one or more FPGA (field-programmable gate arrays), and/or another electronic device. In some examples, the controller 220 and/or the computing device 101 is not a generic controller and/or a generic device, but a device specifically configured to implement functionality for vertical location change notifications based on periodic location reports. For example, in some examples, the computing device 101 and/or the controller 220 specifically comprises a computer executable engine configured to implement functionality for vertical location change notifications based on periodic location reports.

The static memory 222 is a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functional teachings of the computing device 101 as described herein are maintained, persistently, at the memory 222 and used by the controller 220, which makes appropriate utilization of volatile storage during the execution of such programming instructions.

Figure 3:
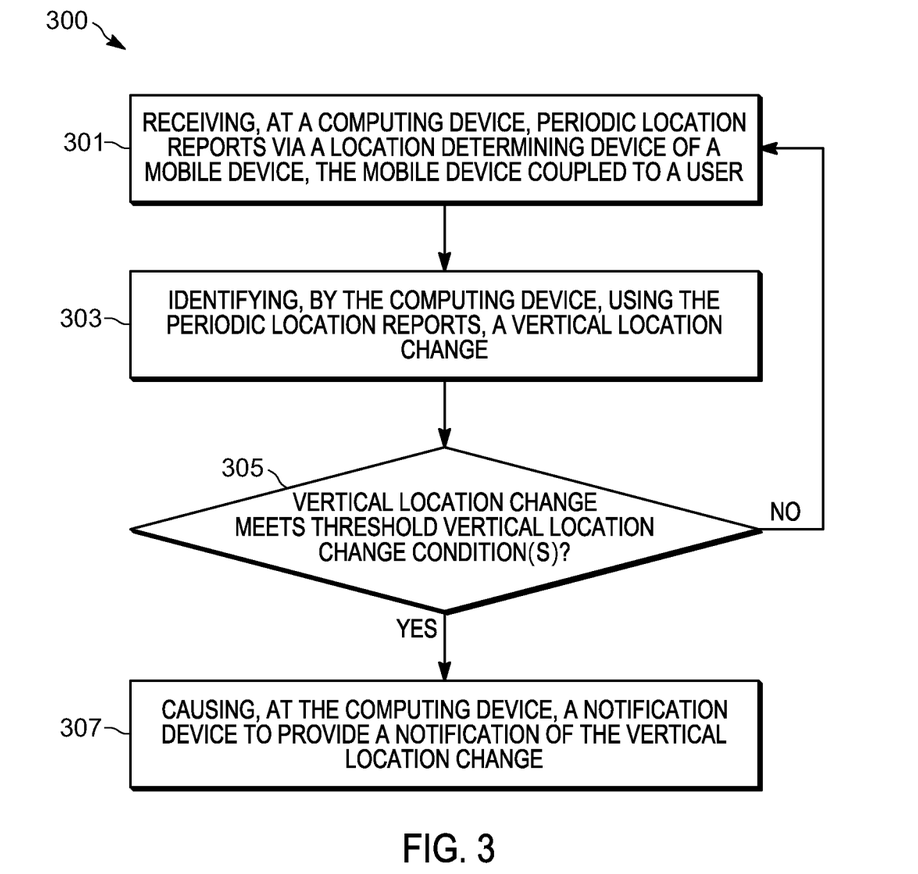
FIG. 3 is a flowchart of a method for vertical location change notifications based on periodic location reports, in accordance with some examples.

In particular, the memory 222 stores instructions corresponding to the at least one application 223 that, when executed by the controller 220, enables the controller 220 to implement functionality described herein including, but not limited to, the blocks of the method set forth in FIG. 3. As depicted, the memory 222 further stores the one or more threshold vertical location change conditions 131; while as depicted the one or more threshold vertical location change conditions 131 are stored separately from the application 223, in other examples the one or more threshold vertical location change conditions 131 may be stored as part of the application 223 (e.g., as a module of the application 223).

In illustrated examples, when the controller 220 executes the one or more applications 223, the controller 220 is enabled to: receive periodic location reports via a location determining device of a mobile device, the mobile device physically coupled to a user; identify, using the periodic location reports, a vertical location change; compare the vertical location change to a threshold vertical location change condition; and responsive to determining that the vertical location change meets the threshold vertical location change condition, cause a notification device to provide a notification of the vertical location change.

The application 223 may include numerical algorithms configured to implement the functionality as described above and/or determine whether a vertical location change meets a threshold vertical location change condition 131, and/or any other suitable functionality of the computing device 101.

Alternatively, and/or in addition to numerical algorithms, the application 223 may include machine learning models and/or algorithms, and the like, which have been trained to implement the functionality as described above and/or determine whether a vertical location change meets a threshold vertical location change condition 131, and/or any other suitable functionality of the computing device 101. In particular, the one or more threshold vertical location change conditions 131 may comprise one or more classifiers, and the like, used by one or more machine learning models and/or algorithms of the application 223 to determine whether a vertical location change is anomalous and/or unusual and/or unexpected and/or dangerous, and the like.

The one or more machine learning models and/or algorithms of the application 223 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments. Any suitable machine learning algorithm and/or deep learning algorithm and/or neural network is within the scope of present examples.

While details of the devices 103, 113, 127, 135 are not depicted, the devices 103, 113, 127, 135 may have components similar to the computing device 101 adapted, however, for the functionality thereof. For example, the mobile devices 103, 113 may include respective display screens (e.g., the notification devices 133-1, 133-2), input devices, speakers, microphones, clocks (including, but not limited to, a clock of a respective controller and/or processor) and the like, and optionally respective accelerometers and/or gyroscopes and/or magnetometers and the like. In particular, at least the mobile devices 113 and the dispatch computing device 135 are understood to include respective notification devices 133, such as respective display screens, speakers and the like, which may be provide notifications of vertical location changes.

Attention is now directed to FIG. 3, which depicts a flowchart representative of a method 300 for vertical location change notifications based on periodic location reports. The operations of the method 300 of FIG. 3 correspond to machine readable instructions that are executed by the computing device 101, and specifically the controller 220 of the computing device 101. In the illustrated example, the instructions represented by the blocks of FIG. 3 are stored at the memory 222 for example, as the application 223. The method 300 of FIG. 3 is one way that the controller 220 and/or the computing device 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 301, the controller 220 and/or the computing device 101 receives the periodic location reports 109 via the location determining device 105 of the mobile device 103, the mobile device 103 physically coupled to the user 107, as described above.

At a block 303, the controller 220 and/or the computing device 101 identifies, using the periodic location reports 109, a vertical location change.

For example, as described above, the controller 220 and/or the computing device 101 may compare locations identified in the reports 109 to determine vertical location changes of the mobile device 103 and/or the user 107. Indeed, as the mobile device 103 is understood herein to be physically coupled to the user 107, a vertical location change of the mobile device 103 is understood to also be a vertical location changes of the user 107.

In particular, a vertical location changes may be determined by determining a difference between vertical locations identified in two or more of the reports 109.

At the block 303, the controller 220 and/or the computing device 101 may further identify a time period over which a vertical location change occurred based, for example, on the times in the reports 109 and/or times that the reports 109 are received.

Furthermore, in some examples, the controller 220 and/or the computing device 101 may identify a plurality of vertical location changes that may be indicated in the reports 109, which may indicate that that the mobile device 103 is falling. In such examples, plurality of vertical location changes, along with associated times, may be used to determine a vertical velocity, and/or an average vertical velocity, and/or changes in vertical velocity, and/or a vertical acceleration, and/or a change in vertical acceleration of the mobile device 103. However, a vertical velocity may be determined from as few as two of the reports 109 and a vertical acceleration may be determined from as few as three of the reports 109. Furthermore, vertical velocities and/or accelerations determined from the reports may also indicate an abrupt stop to vertical movement of the user 107 (e.g., such as when the user 107 falls and hits the ground and/or a floor 123).

While examples described heretofore are with regards to vertical location changes occurring in a downwards direction (e.g., falling), in other examples vertical location changes may occur in an upwards direction, for example when an explosion, and the like, causes the user 107, and the mobile device 103, to move upwards (e.g., rapidly). However, the user 107, and the mobile device 103, may undergo an upward vertical location change due to any suitable reason; for example, a cargo hook, and the like, from a helicopter may "grab" the user 107. When such a helicopter is operated by a malicious entity, such an upward vertical location change may be anomalous; furthermore such an example illustrates that while in FIG. 1 the user 107 (e.g., and the users 117) are depicted as being inside the building 121, the user 107 (e.g., and/or the users 117) may alternatively be located beside the building 121, on a roof of the building 121 and/or in any other environment and/or location where anomalous vertical location changes may occur, which may, or may not, include a building, and which may be upward or downward (e.g., relative to the earth).

Similarly, the reports 109 may further indicate negative acceleration and/or deceleration, for example, relative to the ground and/or relative to an initial acceleration and/or direction of vertical movement of the mobile device 103 and/or the user 107. For example, the mobile device 103 and/or the user 107 may undergo a vertical location change in a downwards direction and, as the mobile device 103 and/or the user 107 hit a supporting surface, the mobile device 103 and/or the user 107 may suddenly slow and/or stop (and/or reverse direction and move in an upwards direction due to a bounce and/or bounces upon hitting a supporting surface). As such, the mobile device 103 and/or the user 107 may undergo negative acceleration and/or deceleration. When direction of movement and/or velocity and/or acceleration of the mobile device 103 and/or the user 107 are available at the device 101, as measured by an accelerometer and/or gyroscope and/or magnetometer of the mobile device 103, such direction of movement and/or velocity and/or acceleration may be used to confirm and/or refine the vertical location change (and/or a direction of movement and/or a velocity and/or an acceleration) as determined from the reports 109 and/or vice versa.

Regardless, the vertical location change determined at the block 303 is understood to be in one of a downwards direction and an upwards direction.

At a block 305, the controller 220 and/or the computing device 101 compares the vertical location change to the one or more threshold vertical location change conditions 131 to determine whether or not the vertical location change meets a threshold vertical location change condition 131 (e.g., and/or more than one threshold vertical location change conditions 131).

Various examples of the one or more threshold vertical location change condition 131 are now discussed.

In some examples, the one or more threshold vertical location change conditions 131 may be time based.

For example, a threshold vertical location change condition 131 may comprise a vertical location change occurring within a given time period. In particular, when a vertical location change of a given distance, and/or greater than a given distance, occurs within a given time period, such a vertical location change may indicate that the user 107 is falling. In these examples, the threshold vertical location change condition 131 may indicate a given distance of a vertical location change, and given time period, and comparing the vertical location change to such a threshold vertical location change condition 131 may comprise determining whether the vertical location change is greater than the given distance and occurs within the given time period. In particular, the controller 220 and/or the device 101 may determine that the vertical location change meets the threshold vertical location change conditions 131 when the vertical location change is greater than the given distance and occurs within the given time period.

The given distance and given time period may selected in accordance with objects falling under the pull of gravity (e.g., gravitational free fall) starting from a velocity of "0", and the like. Hence, for example, it is understood that when objects fall with an acceleration of 9.8 m/s$^2$ under the pull of gravity, after 1 second their velocity is 9.8 m/s and hence the given distance may be selected to be 9.8 m for a given time period of 1 second. However, any suitable given distance and/or given time period is within the scope of the present specification. For example, upward vertical location changes due to explosions may lead to other given distances and/or given time periods. Furthermore, downward vertical location changes due to falling down stairs may lead to yet other given distances and/or given time periods. Similarly, negative acceleration and/or deceleration may lead to other given distances and/or given time periods.

Furthermore, the one or more threshold vertical location change conditions 131 may specify a plurality of given distances and associated given time periods. Alternatively, for example, the one or more threshold vertical location change conditions 131 may indicate that a vertical location change occurs within a dynamic given time period that depends on a distance indicated by the vertical location change. For example, using basic kinematic equations, a determined vertical location change may be used to determine a corresponding time period over which the determined vertical location change occurred if due to the pull of gravity (e.g., due to falling). The actual given time period (e.g., indicated by the reports 109) of the determined vertical location may be compared to the determined given time period from the kinematic equations and, when the actual given time period is equal to, and/or greater than and/or within a given range of the determined given time period, the controller 220 and/or the device 101 may determine that the vertical location change meets the threshold vertical location change conditions 131. In some examples, the actual given time period may be less than, but within a given range (e.g., within 5%) of the determined given time period due to effects of air drag on the user 107.

Similarly, another time-based threshold vertical location change condition 131 may comprise a vertical location change indicating a given velocity of the mobile device 103 and/or the user 107. For example, one or more velocities of the mobile device 103 and/or the user 107 may be determined from the locations and times of the reports 109 and compared to given velocities, which, again, may be determined based on the pull of gravity on the mobile device 103 and/or the user 107. The controller 220 and/or the device 101 may determine that the vertical location change meets the threshold vertical location change conditions 131 when a velocity of the mobile device 103 and/or the user 107 is greater than, or equal to, or within a given range (e.g., within 5%) of a given velocity. Similar to as described above, a given velocity may also be selected dynamically based on kinematic equations.

When more than two reports 109 are received (e.g., and hence more than two locations and associated times), the controller 220 and/or the device 101 may determine an acceleration of the mobile device 103 and/or the user 107. In these examples, a threshold vertical location change condition 131 may comprise a vertical location change indicating a given acceleration of the mobile device 103 and/or the user 107, for example a gravitational acceleration of 9.8 m/s$^2$ (and/or within a given range of gravitational acceleration). Similarly, a threshold vertical location change condition 131 may comprise a vertical location change indicating a negative acceleration and/or a deceleration of the mobile device 103 and/or the user 107, and/or one or more changes from positive to negative acceleration as the mobile device 103 and/or the user 107 bounces, due to hitting a supporting surface.

While the above time-based examples of threshold vertical location change conditions 131 are based on the mobile device 103 and/or the user 107 falling, with given vertical location changes, given time periods, velocities, and accelerations determined accordingly, threshold vertical location change conditions 131 may specify any suitable vertical location changes, time periods, velocities, and/or accelerations.

In other examples, the one or more threshold vertical location change conditions 131 may be based on comparisons of a vertical location change with a corresponding horizontal location change, and which may also be time-based.

For example, in some examples, a threshold vertical location change condition 131 may comprise a vertical location change being greater than a corresponding horizontal location change by a threshold difference therebetween. In related examples, a threshold vertical location change condition 131 may comprise a ratio between the vertical location change and the corresponding horizontal location change being greater than a threshold ratio. Such examples may also include the vertical location change occurring within a given time period.

For example, when the user 107 walks down (or up) stairs, the mobile device 103 and/or the user 107 undergoes both a vertical location change and a horizontal location change. Furthermore, stairs may be constructed according to given standards from which a difference between a vertical and horizontal distance of stairs may be determined and/or a ratio therebetween may be determined. Such differences and/or ratios may be incorporated into one or more threshold vertical location change conditions 131. Alternatively, such differences and/or ratios may be determined from the floor plan 129 and incorporated into one or more threshold vertical location change conditions 131. Furthermore, an average time and/or average velocity for a user to walk, and/or run, down, and/or up, stairs may be determined such that a given time period for the user 107 to walk, and/or run, down, and/or up, stairs may be determined.

Hence, a threshold vertical location change condition 131 may comprise the vertical location change of the mobile device 103 and/or the user 107 being greater than a corresponding horizontal location change by a threshold difference therebetween, that is determined from vertical and horizontal distance of stairs described above, and which occurs within a given time period, and/or is less than a given time period, the given time period being a minimum determined time for a user to traverse stairs (e.g., up or down). Put another way, such a threshold vertical location change condition 131 may indicate the user 107 is falling down stairs. Alternatively, such a threshold vertical location change condition 131 may be based on a ratio between the vertical location change and the corresponding horizontal location change of the user 107 being greater than a threshold ratio based on ratios of vertical and horizontal distances of stairs, with the vertical location change occurring within such a given time period.

In yet further examples, the one or more threshold vertical location change conditions 131 may be based on environmental context, as determined from the floor plan 129 and/or the communications 119.

For example, when the floor plan 129 is available, the controller 220 and/or the device 101 may determine a location of a vertical location change of the mobile device 103 and/or the user 107 relative to the floor plan 129. In particular, the location of a vertical location change may be determined from the reports 109 (e.g., a location of one or more of the reports 109). In these examples, a threshold vertical location change condition 131 may comprise determining that the location of the vertical location change is where the user 107 is supposed to be supported by a supporting surface of the floor plan 129. Put another way, when the floor plan 129 indicates that there is no opening and/or open space in a floor 123 at the location of the user 107, and the user 107 is hence falling through a floor 123 where there is supposed to be a supporting surface, a hole may have opened in the floor 123 (e.g., the floor 123-2) and the user 107 may have dropped therethrough (e.g., an hit a supporting surface of a floor 123 below, such as the floor 123-1).

In other examples where the floor plan 129 is available, and a location of a vertical location change of the mobile device 103 and/or the user 107 relative to the floor plan 129 is determined, a threshold vertical location change condition 131 may comprise determining that the location of the vertical location change is where an open space of the floor plan 129 is located, the open space being absent of stairs, an elevator, a respective supporting surface, a device for safely traversing vertical floors of the building, or a building component for safely traversing the vertical floors of the building. Put another way, the user 107 may have fallen off a balcony, an atrium, a roof, and the like, of the building 121 and into an open space, the location of the user 107 relative to the floor plan 129 indicating that the vertical location change occurred at the open space.

In yet further examples, where the floor plan 129 is available, and a location of a vertical location change of the mobile device 103 and/or the user 107 relative to the floor plan 129 is determined, a threshold vertical location change condition 131 may comprise determining that the location of the vertical location change is where an elevator is located, but the user 107 is moving faster than a speed of the elevator (e.g., may be determined from specifications of the elevator in the floor plan 129 and/or from predetermined speeds of elevators configured at the application 223). Put another way, such a vertical location change meeting such a threshold vertical location change condition 131 may indicate that the user 107 has fallen down an elevator shaft.

In other examples, the computing device 101 may monitor the communications 119 to determine whether, or not, the user 107 (and/or another user 117) is indicating that the user 107 will undergo a vertical location change. For example, in the communications 119, the user 107 (and/or another user 117) may verbally indicate that the user 107 is walking down. or up. stairs, taking an elevator, and the like. When a vertical location change occurs that has not been indicated in the communications 119, the user 107 may have fallen down stairs and/or into an elevator shaft, and the like. Hence, in these examples, a threshold vertical location change condition 131 may comprise determining that there is no indication of the vertical location change (e.g., determined at the block 303) in the communications 119. In other examples, the user 107 and/or another user 117 may verbally indicate in the communications 119 that the user 107 is falling down stairs. Indeed, any suitable indication of a vertical location change being unexpected in the communications 119, that may be incorporated into a threshold vertical location change condition 131 (e.g., as classifier), is within the scope of the present specification.

Hence, the method 300 may further comprise the controller 220 and/or the device 101: determining an environmental context of the user 107 by at least one of: receiving the floor plan 129 of the building 121 in which the user 107 is located; and monitoring communications 119 associated with the mobile device 103, and a threshold vertical location change condition 131 is based on the environmental context.

More specifically with regards to the floor plan 129, the method 300 may further comprise the controller 220 and/or the device 101: receiving the floor plan 129 of the building 121 in which the user 107 is located; and determining a location of the vertical location change relative to the floor plan 129, a threshold vertical location change condition 131, in these examples, comprising one or more of: determining that the location of the vertical location change is where the user 107 is being supported by a supporting surface of the floor plan 129; and determining that the location of the vertical location change is where an open space of the floor plan 129 is located, the open space being absent of stairs, an elevator, a respective supporting surface, a device for safely traversing vertical floors of the building 121, or a building component for safely traversing the vertical floors of the building 121.

More specifically with regards to the communications 119, the method 300 may further comprise the controller 220 and/or the device 101: monitoring communications 119 associated with the mobile device 103, a threshold vertical location change condition 131 comprising, in these examples, determining that there is no indication of the vertical location change in the communications 119, amongst other possibilities.

Responsive to determining that the vertical location change meets a threshold vertical location change condition 131 (e.g., a "YES" decision at the block 305), at a block 307, the controller 220 and/or the computing device 101 causes a notification device 133 to provide a notification of the vertical location change. For example, the controller 220 and/or the computing device 101 may transmit a notification, and the like, to one or more of the devices 113, 135 to cause a respective notification device 133 to provide a notification of the vertical location change. As has already been described, while the notification devices 133 may be, as depicted, display screens, the notification devices 133 may include one or more of a display screen, a speaker and a haptic device. Hence, when a notification device 133 is a display screen, such a notification may comprise text and/or graphics and/or video, and the like, indicating a name and/or role (e.g., in an organizational hierarchy) and/or other identifier (e.g., a badge and/or an employee number) of the user 107, an indication of their current location, directions to their current location (e.g., from a location of a user 117), and an indication of the vertical location change. When a notification device 133 is a speaker, the notification may comprise audio indicating similar information. When a notification device 133 is a haptic device, the haptic device may be controlled according to a vibrational pattern indicating a vertical location change, and furthermore such a vibrational pattern may further identify the user 107.

Hence, at the block 307, causing a notification device 133 to provide a notification of a vertical location change may comprise: providing the notification at one or more of a display screen, a speaker and a haptic device.

In some examples, at the block 307, the controller 220 and/or the device 101 may select devices 113, 127 to which a notification is to be transmitted. For example, the controller 220 and/or the device 101 may cause a notification device 133 to provide the notification of the vertical location change by transmitting the notification, to one or more of: a supervisory device; an emergency medical device; the dispatch device 135; and a mobile device 113, which is one or more of: nearest to the mobile device 103; and within a predetermined distance to the mobile device 103.

For example, at the block 307, the controller 220 and/or the device 101 may transmit a notification to mobile device 113 of a supervisor of the user 107 (e.g., a supervisory device) who may be overseeing an incident (e.g., such as a fire) at the building 121, to let the supervisor know that the user 107 may be injured so that the supervisor may plan accordingly and move to the location of the user 107. Similarly, the supervisor may then alert medical personal as to the vertical location change of the user 107. Alternatively, the controller 220 and/or the device 101 may transmit a notification to a mobile device 113 of a medical technician (e.g., an emergency medical device) who may then move to the location of the user 107 to provide emergency medical care. Similarly, the controller 220 and/or the device 101 may transmit a notification to the dispatch device 135 so that the dispatcher 137 may alert medical personal as to the location of the user 107.

In some specific examples, when the computing device 101 has access to locations of the mobile device 113, the controller 220 and/or the device 101 may transmit a notification to a further mobile device 113 that is nearest to the mobile device 103, so that a user 117 nearest the user 107 may move to the user 107 to assess their situation after the vertical location change. Alternatively, the controller 220 and/or the device 101 may transmit a notification to one or more further mobile devices 113 that is within a predetermined distance to the mobile device 103, and which may also be elevation based, so users 117 on a same floor 121 as the user 107 are alerted as to the vertical location change. The predetermined distance may be any suitable distance such as 10 horizontal meters, 20 horizontal meters and/or any other suitable distance; in some examples, geofences may be used to define such a predetermined distance.

In yet further examples, the method 300 may further comprise the controller 220 and/or the device 101: selecting one or more supervisory devices (e.g., one or more mobile devices 113) associated with one or more supervisors of the user 107, based on one or more of: current locations of the one or more supervisory devices; historical data associated with the one or more supervisory devices or the one or more supervisors; roles of the one or more supervisors relative to the user; and threshold notification conditions. In these examples, causing a notification device 133 to provide a notification of a vertical location change may comprises transmitting the notification to one or more selected supervisory devices (e.g., selected mobile devices 113).

For example, whether or not a notification is transmitted to a supervisory devices (e.g., one or more mobile devices 113) may depend on information associated with a supervisor available to the computing device 101 (e.g., which may be stored in employee records, and the like). For example different supervisors, and or associated mobile devices 113, may be associated with different threshold notification conditions, which may be role-based and provided in the application 223. For example, the user 107 may directly report to a first supervisor but not a second supervisor, and hence, a notification may be transmitted to a mobile device 113 of the first supervisor but not the second supervisor. Such relationships may be determined via roles of the one or more supervisors relative to the user 107, as indicated in the aforementioned electronic organizational hierarchy and/or employee records. In a particular example, threshold notification conditions may indicate that supervisors having a given role, relative the user 107 (e.g., a direct supervisor), are to be notified, while supervisors having other given roles, relative the user 107 (e.g., a supervisor of a supervisor, and/or a supervisor who does not supervise of the user 107) are not to be notified.

Similarly, when a current location of a first supervisor within a threshold distance (e.g., 5 meters to 10 meters, and the like) of the user 107 associated with the vertical location change, it may be assumed the first supervisor already knows about the user 107, and a notification may not be transmitted to an associated mobile device 113 of the first supervisor; however, a notification may be transmitted to an associated mobile device 113 of a second supervisor who is further away so they can assist and/or take over management of an incident at the building 121, as the first supervisor may be distracted by the user 107. Indeed, in these examples, the notification may include an indication that the first supervisor may already be aware of the vertical location change.

However, in further examples, for particular vertical location changes, for example vertical location changes that are greater than a threshold height, which may indicate a serious injury in the user 107, the controller 220 and/or the device 101 may transmit the notification as a system wide notification to all the devices 113, 113, 135, for example as an automatic "mayday" notification and the like.

In yet further examples, selecting one or more supervisory devices to which a notification is to be transmitted may be based on historical data associated with the one or more supervisory devices or the one or more supervisors. For example, historical data, which may be stored in employee records, and the like, may indicate that certain supervisors and/or users 117 have certain skills, such as emergency medical experience and the like, even if not strictly a medical technician, and hence a notification of the vertical location change may be transmitted to mobile devices 113 of such supervisors and/or users 117.

However, the historical data associated with the one or more supervisory devices or the one or more supervisors may alternatively indicate that notification preferences of a given supervisor. For example, consider that two supervisors (e.g., two users 117) are assigned to different incidents; a first supervisor may historically always dismiss notifications regarding other incidents when assigned to a different incident, while a second supervisor may always respond to notifications regardless of an assigned incident. Hence, for example, when the users 117 are both assigned to an incident different from the incident to which the user 107 is assigned, historical data available to the device 101 may indicate that the user 117-1 is not to receive a notification of a vertical threshold change of the user 107, while the user 117-2 is to receive a notification thereof. However, in some examples where historical data indicates that the user 117-1 is not to receive a notification of a vertical location change of the user 107, the device 101 may weight such historical data relative the user 117-1 being a closest user to the user 107 and nonetheless transmit a notification (e.g., due to the severity of the vertical threshold change).

Hence, any suitable historical data that indicates whether a user 117, and/or mobile device 113 thereof, is to be notified, or not, of a vertical location change of the user 107 is within the scope of the present specification. Similarly, any suitable weighting scheme for selecting a supervisory device, to which to transmit notifications, is within the scope of the present specification.

Figure 4:
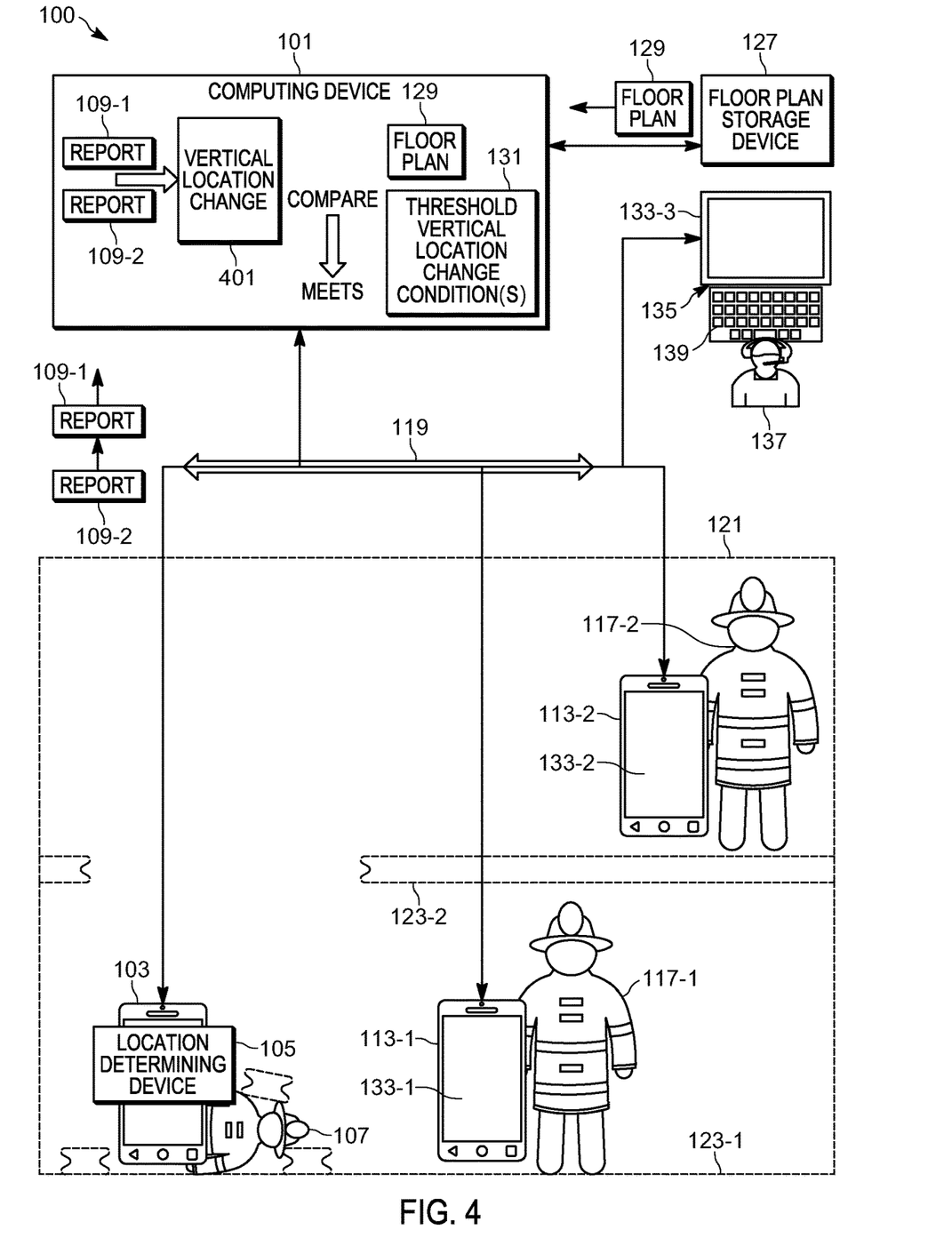
FIG. 4 depicts aspects of an example of a method for vertical location change notifications based on periodic location reports implemented in the system of FIG. 1.
Figure 5:
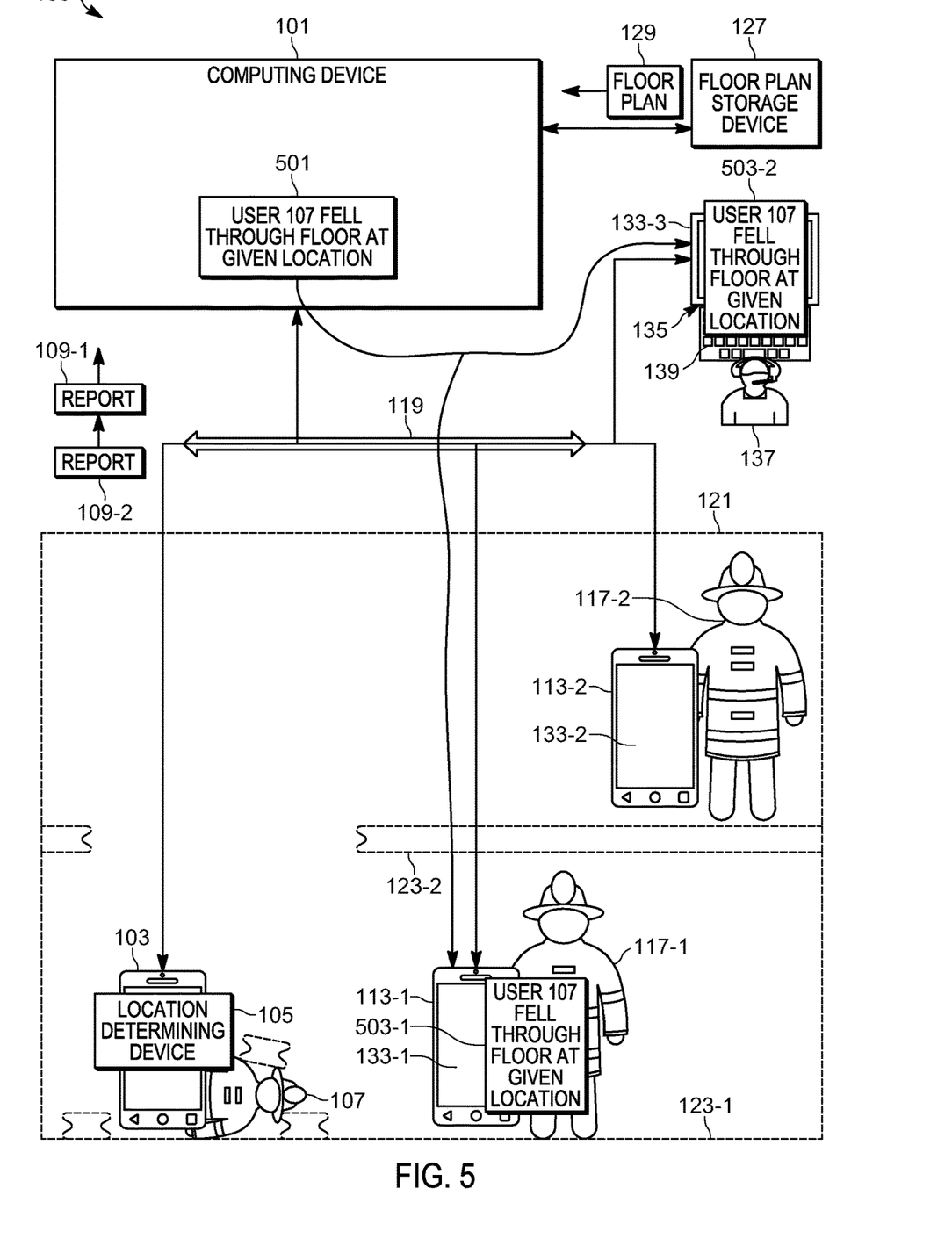
FIG. 5 depicts further aspects of the example of the method for vertical location change notifications based on periodic location reports implemented in the system of FIG. 1.

Attention is next directed to FIG. 4 and FIG. 5, which depict an example of the method 300 being implemented in the system 100. FIG. 4 and FIG. 5 are substantially similar to FIG. 1, with like components having like numbers.

In particular, comparing FIG. 4 with FIG. 1, it is understood that, in FIG. 4, the user 107 has fallen through the floor 123-2, for example due to a fire, a structural collapse of a support surface, and the like, and hence as undergone a vertical location change, as described above. For example, as compared to FIG. 1, the user 107 is prone at the floor 123-1, surrounded by debris from a hole that opened up at the floor 123-2. However, the mobile device 103 continues to provide the reports 109 to the computing device 101. In the depicted example, it is assumed that the first report 109-1 is transmitted prior to the user 107 undergoing the vertical location change, and hence the first report 109-1 includes a location associated with the user 107 being located at the floor 123-2; similarly, in the depicted example, it is assumed that the second report 109-2 is transmitted after the user 107 has undergone the vertical location change, and hence the second report 109-2 includes a location associated with the user 107 being located at the floor 123-1.

As depicted, the computing device 101 has received (e.g., at the block 301 of the method 300) the reports 109, and identifies (e.g., at the block 303 of the method 300) a vertical location change 401 from the reports 109, for example by determining a difference between locations indicated in the reports 109. While not depicted, the computing device 101 may also determine a time period over which the vertical location change 401 occurred.

As depicted, the computing device 101 compares (e.g., at the block 305 of the method 300) the vertical location change 401 with the one or more threshold vertical location change conditions 131.

As also depicted, the computing device 101 determines (e.g., a "YES" decision at the block 305) that the vertical location change 401 meets a threshold vertical location change condition 131, as indicated by the text "MEETS". For example, as depicted, a location of the vertical location change 401 may be determined, from the floor plan 129, to be at a location of a supporting surface of the floor 123-2 (e.g., where a hole, and the like, is not indicated in the floor plan 129), and the vertical location change 401 and a corresponding time period over which the vertical location change 401 occurred may indicate that the user 107 underwent gravitational free fall. Regardless, the computing device 101 determines that the vertical location change 401 meets a threshold vertical location change condition 131 and/or more than one threshold vertical location change conditions 131.

Attention is next directed to FIG. 5, which depicts, the computing device 101, responsive to determining that the vertical location change 401 meets the threshold vertical location change condition 131, causing a notification device 133 to provide a notification of the vertical location change 401. For example, as depicted, the computing device 101 generates and transmits a notification 501 to the mobile device 113-1 nearest the user 107 (e.g., and on the same floor 121-1), as well as the dispatch device 135. However, as depicted, the computing device 101 excludes the mobile device 113-2 from transmission of the notification 501. It is understood that the devices 113-1, 135 receive the notification 501 and responsively cause the notification devices 133-1, 133-3 to provide the notification 501, for example in respective windows 503-1, 503-2 at respective notification display screens of the notification devices 133-1, 133-3. While to better show text of the notification 501, as depicted the windows 503-1, 503-2 are larger than the respective display screens, it is understood that windows 503-1, 503-2 are generally contained onto a respective display screen.

As depicted, the notification 501 comprises text indicating that the "USER 107 FELL THROUGH FLOOR AT GIVEN LOCATION" where the text "USER 107" identifies the user 107, the term "FELL THROUGH FLOOR" indicates the vertical location change 401), and the term "GIVEN LOCATION" identifies the location in the second report 109-2 (e.g., at the floor 123-1). However, the notification 501 may comprise any suitable information and/be provided at any suitable notification devices 133 in any suitable manner.

As should be apparent from this detailed description above, the operations and functions of computing devices described herein are sufficiently complex as to require their implementation on a computer system, and cannot be performed, as a practical matter, in the human mind. Computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
receiving, at a computing device, periodic location reports via a location determining device of a mobile device, the mobile device physically coupled to a user, the location determining device comprising one or more of a device and a circuit for determining a vertical location, a three-dimensional location and an elevation;
identifying, by the computing device, using the periodic location reports, a vertical location change by determining a difference between vertical locations identified in two or more of the periodic location reports;
comparing, by the computing device, the vertical location change to a threshold vertical location change condition; and
responsive to determining, by the computing device, that the vertical location change meets the threshold vertical location change condition, causing a notification device to provide a notification of the vertical location change.

2. The method of claim 1, wherein the vertical location change is in one of a downwards direction and an upwards direction.

3. The method of claim 1, wherein the threshold vertical location change condition comprises one or more of:
the vertical location change occurring within a given time period;
the vertical location change occurring within a dynamic given time period that depends on a distance indicated by the vertical location change;
the vertical location change indicating a given velocity of the mobile device; and
the vertical location change indicating a given acceleration of the mobile device.

4. The method of claim 1, wherein the threshold vertical location change condition comprises one or more of:
the vertical location change being greater than a corresponding horizontal location change by a threshold difference therebetween; and
a ratio between the vertical location change and the corresponding horizontal location change being greater than a threshold ratio.

5. The method of claim 1, further comprising determining an environmental context of the user by at least one of: receiving a floor plan of a building in which the user is located; and monitoring communications of the mobile device,
and wherein the threshold vertical location change condition is based on the environmental context.

6. The method of claim 1, further comprising:
receiving a floor plan of a building in which the user is located; and
determining a location of the vertical location change relative to the floor plan,
wherein the threshold vertical location change condition comprises one or more of:
determining that the location of the vertical location change is where the user is being supported by a supporting surface of the floor plan; and
determining that the location of the vertical location change is where an open space of the floor plan is located, the open space being absent of stairs, an elevator, a respective supporting surface, a device for safely traversing vertical floors of the building, or a building component for safely traversing the vertical floors of the building.

7. The method of claim 1, further comprising monitoring communications associated with the mobile device,
and wherein the threshold vertical location change condition comprises: determining that there is no indication of the vertical location change in the communications.

8. The method of claim 1, wherein causing the notification device to provide the notification of the vertical location change comprises:
providing the notification at one or more of a display screen, a speaker and a haptic device.

9. The method of claim 1, wherein causing the notification device to provide the notification of the vertical location change comprises transmitting the notification to one or more of:
a supervisory device;
an emergency medical device;
a dispatch device; and
a further mobile device, which is one or more of: nearest to the mobile device; and within a predetermined distance to the mobile device.

10. The method of claim 1, further comprising:
selecting one or more supervisory devices associated with one or more supervisors of the user, based on one or more of: current locations of the one or more supervisory devices; historical data associated with the one or more supervisory devices or the one or more supervisors; roles of the one or more supervisors relative to the user; and threshold notification conditions,
wherein causing the notification device to provide the notification of the vertical location change comprises transmitting the notification to one or more selected supervisory devices.

11. A device comprising:
a communication unit; and
a controller communicatively coupled to the communication unit, the controller configured to:
receive periodic location reports via a location determining device of a mobile device, the mobile device physically coupled to a user, the location determining device comprising one or more of a device and a circuit for determining a vertical location, a three-dimensional location and an elevation;
identify, using the periodic location reports, a vertical location change by determining a difference between vertical locations identified in two or more of the periodic location reports;
compare the vertical location change to a threshold vertical location change condition; and
responsive to determining that the vertical location change meets the threshold vertical location change condition, cause, via the communication unit, a notification device to provide a notification of the vertical location change.

12. The device of claim 11, wherein the vertical location change is in one of a downwards direction and an upwards direction.

13. The device of claim 11, wherein the threshold vertical location change condition comprises one or more of:
the vertical location change occurring within a given time period;
the vertical location change occurring within a dynamic given time period that depends on a distance indicated by the vertical location change;
the vertical location change indicating a given velocity of the mobile device; and
the vertical location change indicating a given acceleration of the mobile device.

14. The device of claim 11, wherein the threshold vertical location change condition comprises one or more of:
the vertical location change being greater than a corresponding horizontal location change by a threshold difference therebetween; and
a ratio between the vertical location change and the corresponding horizontal location change being greater than a threshold ratio.

15. The device of claim 11, wherein the controller is further configured to determine an environmental context of the user by at least one of: receiving a floor plan of a building in which the user is located; and monitoring communications of the mobile device,
and wherein the threshold vertical location change condition is based on the environmental context.

16. The device of claim 11, wherein the controller is further configured to:
receive a floor plan of a building in which the user is located; and
determine a location of the vertical location change relative to the floor plan,
wherein the threshold vertical location change condition comprises one or more of:
determining that the location of the vertical location change is where the user is being supported by a supporting surface of the floor plan; and
determining that the location of the vertical location change is where an open space of the floor plan is located, the open space being absent of stairs, an elevator, a respective supporting surface, a device for safely traversing vertical floors of the building, or a building component for safely traversing the vertical floors of the building.

17. The device of claim 11, wherein the controller is further configured to monitor communications associated with the mobile device,
and wherein the threshold vertical location change condition comprises: determining that there is no indication of the vertical location change in the communications.

18. The device of claim 11, wherein the controller is further configured to cause the notification device to provide the notification of the vertical location change by:
providing the notification at one or more of a display screen, a speaker and a haptic device.

19. The device of claim 11, wherein the controller is further configured to cause the notification device to provide the notification of the vertical location change by transmitting the notification to one or more of:
a supervisory device;
an emergency medical device;
a dispatch device; and
a further mobile device, which is one or more of: nearest to the mobile device; and within a predetermined distance to the mobile device.

20. The device of claim 11, wherein the controller is further configured to:
select one or more supervisory devices associated with one or more supervisors of the user, based on one or more of: current locations of the one or more supervisory devices; historical data associated with the one or more supervisory devices or the one or more supervisors; roles of the one or more supervisors relative to the user; and threshold notification conditions;
and cause the notification device to provide the notification of the vertical location change by transmitting the notification to one or more selected supervisory devices.

* * * * *